April 29, 1969
B. O. BURRITT
3,441,263
SPRING AMPLIFYING DEVICE
Filed May 12, 1967
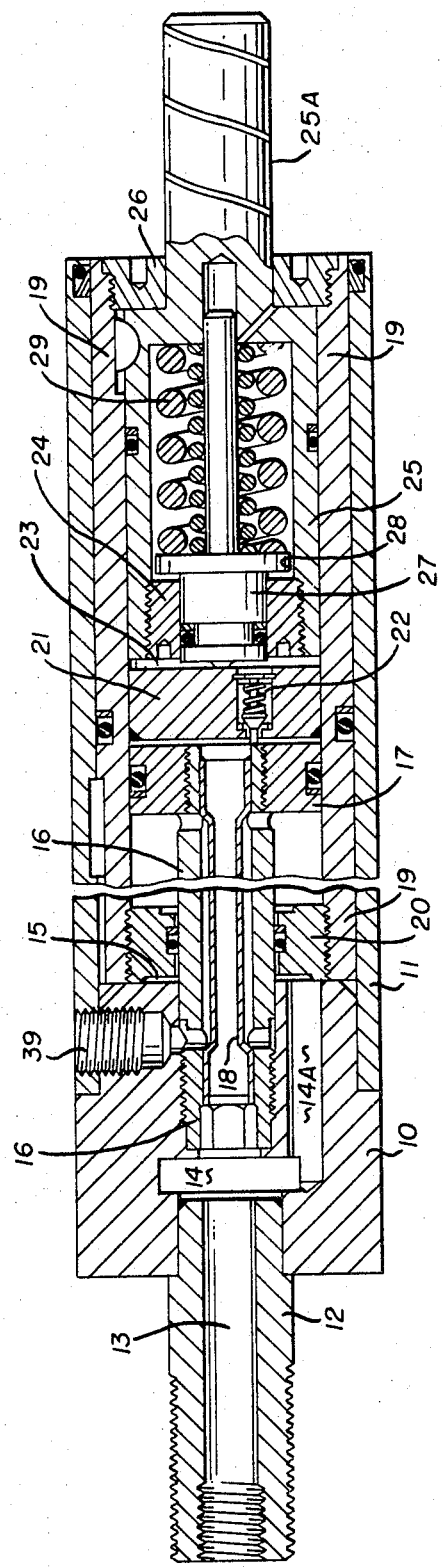
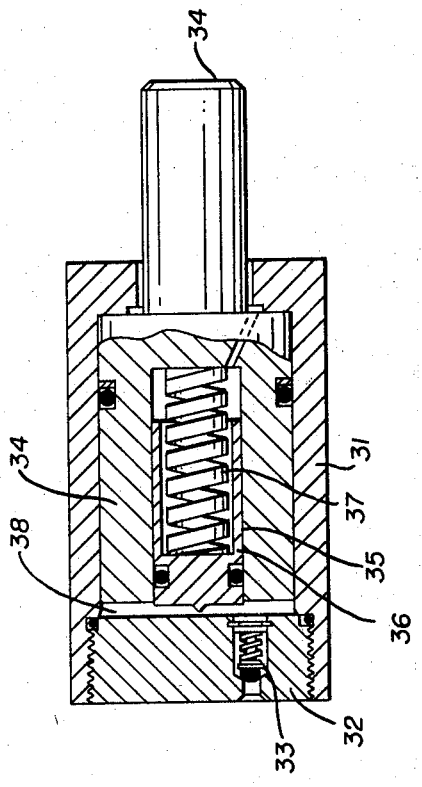
INVENTOR.
BURNELL O. BURRITT
BY
*W. B. Hanzman*
ATTORNEY United States Patent Office 3,441,263
Patented Apr. 29, 1969

3,441,263
SPRING AMPLIFYING DEVICE
Burnell O. Burritt, Alpena, Mich., assignor to Universal Fluid Dynamics Company, Alpena, Mich., a corporation of Michigan
Filed May 12, 1967, Ser. No. 638,150
Int. Cl. F16f 5/00, 9/00; F16d 31/06
U.S. Cl. 267—1
5 Claims

ABSTRACT OF THE DISCLOSURE

A spring amplifying device consisting of a housing in the form of a cylinder having a first piston movable in said cylinder with an extension on said piston extending exteriorly of said cylinder, a second piston in an axial bore in said first piston, and a spring in said bore urging said second piston out of said bore relative to said first piston, a portion of said housing forming a closure spaced with respect to said first piston and said second piston and hydraulic fluid in the area between said closure and said first and second pistons with the spring urged second piston exerting pressure on said hydraulic fluid which pressure is multiplied thereby and applied to the first piston which is of a substantially larger area than the second piston.

---

This invention relates to a spring amplifying device and more particularly to a device utilizing a combination of spring tension and hydraulic pressure to amplify the spring tension through a differential in areas of the device in contact with the hydraulic pressure medium.

A further object of the invention is the provision of a spring amplifying device of simple and economic construction that may be incorporated in pressure applying devices and used to exert additional pressure on a workpiece, for example.

A still further object of the invention is the provision of a spring amplifying device that is primarily a hydraulic piston and cylinder with a secondary piston located in a bore in the piston of the piston and cylinder, and urged out of the bore by a spring so that the spring pressure is conveyed through the piston in the bore to the hydraulic fluid in the hydraulic piston and cylinder, and multiplied by the differences in area of the respective pistons.

The present invention is particularly useful in increasing pressures applied, for example, to workpieces by various tools such as, for example, a hydraulic welding gun. The invention achieves its primary object by utilizing the force of a caged spring moving against a first piston, the bore of which forms the cage for the spring, and against a second piston slidably mounted in the bore. The spring pressure thus exerted on the second piston is transferred to hydraulic fluid which conveys this spring pressure to the relatively larger surfaces of the first piston.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a vertical section through a portion of a hydraulic welding gun showing the spring amplifier formed integrally therewith.

FIGURE 2 is a vertical section through a spring amplifier.

By referring to the drawings, and FIGURE 1 in particular, it will be seen that a movable jaw piece for a hydraulic welding gun has been shown with parts broken away, and parts in cross-section, and that it comprises a body member 10 having a cylindrical extension 11 secured thereto and extending outwardly therefrom. The body member 10 has a mounting arm 12 secured thereto, the mounting arm 12 having a fluid passageway 13 extending longitudinally thereof and communicating with a chamber 14 in the body member 10 and including a longitudinal drilled extension 14–A also in the body member 10. The drilled extension 14–A communicates with one side of the body member 10 which is within the cylindrical extension 11 and therefore generally communicates with the interior of said cylindrical extension 11 and in particular with the inner end portion thereof, which is indicated in the drawings by the numeral 15.

The body member 10 receives and holds a first tubular extension 16 one end of which communicates with the chamber 14 and the other end of which extends into and is secured to a first piston 17. A second tubular extension 18 of a diameter smaller than the inner diameter of the first tubular extension 16, is positioned in the said first tubular extension 16 so that it comprises an axial passageway for fluid from the chamber 14 and conveys the same through the first piston 17 by way of the drilled opening therethrough in which both the first and second tubular extensions 16 and 18 are secured. A second cylindrical member 19 is reciprocably positioned within the first cylindrical member 11, and its innermost end is secured to a centrally apertured closure 20 through which central aperture the first and second tubular extensions 16 and 18 extend. An apertured partition 21 is secured transversely of the second cylindrical member 19 substantially midway between its ends, and a check valve 22 is mounted in the aperture in the transverse partition 21 so that hydraulic fluid in the second tubular extension 18 and in engagement with the one side of the transverse partition 21 will be able to open the check valve 22 and flow therethrough into a secondary chamber 23 and adjacent the head 24 of a combined piston and piston rod 25, the rod portion of which extends axially through an apertured closure 25 which is affixed to the outer end of the second cylindrical member 19. The extending rod portion of the combination piston and piston rod 25 is indicated by the numeral 25–A.

The combination piston and piston rod 25 is hollow, and it encloses a secondary combination piston and piston rod 27, the piston portion of which extends through the apertured head 24 heretofore referred to, with the outermost surface of the piston portion extending slightly into the chamber 23 heretofore referred to. The opposite or inner end portion of the piston portion is provided with an annular flange 28 and a pair of coil springs 29 and 30 are positioned about the rod portion of the secondary combination piston and piston rod 27 and engaged against the first mentioned combination piston and piston rod 25 and the flange 28 of the secondary combination piston and piston rod 27.

It will thus be observed that hydraulic fluid under pressure introduced through the passageway 13 into the chamber 14 will be present in the inner end 15 of the cylindrical member 11 and against the closure 20 which is secured to the second cylindrical member 19. The hydraulic fluid under pressure will also be present in the space between the first piston 17 and the transverse partition 21, and it will therefore urge the cylindrical member 19 to the right as seen in FIGURE 1 of the drawings. The hydraulic fluid under pressure will open the check valve 22 and flow into the chamber 23 adjacent the head 24 of the combination piston and piston rod 25, and therefore it will be present against the piston portion of the secondary combination piston and piston rod 27. A boss on the secondary combination piston and piston rod 27 prevents the piston portion from moving into flat engagement with the transverse partition 21 and thus insures establishment of the chamber 23.

The check valve 22 which supplies hydraulic fluid under pressure to the chamber 23 acts as a filling and replenishing port with respect to the operation of the spring amplifier itself which comprises the combination piston and piston rod 25 and the secondary combination piston and piston rod 27 therein, and the springs 29 and 30 caged thereby.

In the form of the invention illustrated the end area of the piston portion of the secondary combination piston and piston rod 27 is one-fourth that of the end area of the head 24 and the combination piston and piston rod 25 in which it is positioned. Assuming that the springs 29 and 30 exert a force of 400 pounds on the secondary combination piston and piston rod 27, a pressure of 400 p.s.i. would be developed in the chamber 23. This hydraulic pressure would act upon the end area of the head 24 and the combination piston and piston rod 25, giving a total force of 1600 p.s.i. on the rod portion 25–A of the combination piston and piston rod 25. The force of 400 pounds developed by springs 29 and 30 against the secondary combination piston and piston rod 27 is counteracted by an equal force oppositely against the combination piston and piston rod 25 and this force adds to that hydraulically developed and gives a total of 2000 pounds of force to the rod portion 25–A of the combination piston and piston rod 25. Thus, a combined force of 2000 pounds is developed from the springs 29 and 30 with an active area ratio of four to one between combination piston and piston rod 25 and the secondary combination piston and piston rod 27. Piston seals, as known in the art, prevent leakage of fluid between the respective movable parts, as illustrated in the drawings.

By referring now to FIGURE 2 of the drawings a simplified form of the spring amplifier disclosed in connection with FIGURE 1 may be seen, and it comprises a housing 31 which compares with the combination piston and piston rod 25 of FIGURE 1. The housing is provided with a closure 32 at one end, which is apertured and carries a check valve 33 and the housing is apertured at the other end and a rod extension of a combination piston and piston rod 34 extends therethrough. The piston portion of the combination piston and piston rod 34 is drilled as at 35 and it receives a secondary piston 36 which is urged outwardly of the combination piston and piston rod 34 by a coil spring 37.

Assuming again that the area of the piston 36 is one-fourth the area of the adjacent end portion of the combination piston and piston rod 34, and also assuming that the spring 37 would exert a force of 400 pounds against the piston 36, a like pressure of 400 p.s.i. would be developed in the area between the apertured partition 32 and the piston 36 and which area is indicated by the numeral 38. This hydraulic pressure would act upon the end area of the combination piston and piston rod 34, giving an outward force of 1600 p.s.i. on the projecting rod portion of the combination piston and piston rod 34. This force of 400 p.s.i. developed by the spring 37 against the piston 36 is counteracted by an equal force oppositely against the combination piston and piston rod 34. This force adds to that hydraulically developed and gives a total of 2000 pounds force to the extending rod portion of the combination piston and piston rod 34. Thus, a combined force of 2000 pounds is developed from the spring 37 with an active area ratio of four to one between the respective movable parts.

In the embodiment disclosed in FIGURE 1 of the drawing, this force moves an electrode of a hydraulic welding gun against the workpiece to provide suitable clamping pressure, as will be understood by those skilled in the art, and those skilled in the art will observe that the construction is provided with a return port 39 through which hydraulic fluid under pressure may be introduced to retract the movable portions of the hydraulic welding gun. The check valve 22 prevents loss of hydraulic fluid from the spring amplifier during the retracting operation, and as hereinbefore noted, acts to refill or replenish the hydraulic fluid necessary for the hydraulic multiplication of pressures which comprise the principal object of the invention.

Those skilled in the art will observe that the check valve 22 in FIGURE 1 of the drawing has an extension axially thereof, of a length sufficient to enable the piston 17 to engage the same and open the check valve 22 at the extreme end of the piston's stroke. This prevents an accumulation of fluid in chamber 23, which is undesirable.

It will thus be seen that a spring amplifier has been disclosed which has been illustrated in connection with a typical application in a welding gun, and those skilled in the art will note that the spring amplifier may be used in other applications where space limitations preclude the use of conventional spring devices.

Those skilled in the art will recognize that the spring amplifier disclosed herein can replace a conventional coil spring or springs with greatly improved results. Coil springs have an inherent high stress and breakage is common. The particular application illustrated herein requires a very high loaded spring force with a limited deflection, and the spring amplifier is particularly suitable in such an application.

It will thus be seen that a spring amplifier has been disclosed which meets the several objects of the invention, and having thus described my invention, what I claim is:

1. A spring amplifier comprising a housing defining a cylindrical chamber, a piston movably mounted in said cylindrical chamber, said piston having a bore inwardly on one end thereof, a secondary piston movably mounted in said bore and a spring positioned in said bore and normally urging said secondary piston outwardly of said bore, a closure defining one end of said cylindrical chamber adjacent said bore and secondary piston and means in said closure for passing hydraulic fluid into said cylindrical chamber and retaining the same therein, an opening in the opposite end of said cylindrical chamber with respect to said closure and a rod on said piston extending outwardly through said opening whereby the force of said spring against said secondary piston is transmitted thereby to said hydraulic fluid and multiplied by the relatively wider area of said piston against which said hydraulic fluid is urged.

2. The spring amplifier set forth in claim 1 and wherein the piston and secondary piston have an area ratio of four to one.

3. The spring amplifier set forth in claim 1 and wherein said spring comprises a compressed coil spring.

4. The spring amplifier set forth in claim 1 and wherein said means in said closure for introducing hydraulic fluid into said cylindrical chamber comprises a one-way check valve normally closed against said cylindrical chamber.

5. The spring amplifier set forth in claim 1 and wherein spacing means is positioned between said secondary piston and said closure.

References Cited

UNITED STATES PATENTS 2,778,627   1/1957   Sands _____ 92—52 XR

MARTIN P. SCHWADRON, *Primary Examiner.*

R. R. BUNEVICH, *Assistant Examiner.*

U.S. Cl. X.R.

60—54.5; 92—113